(12) United States Patent
Wehninck

(10) Patent No.: US 10,345,580 B2
(45) Date of Patent: Jul. 9, 2019

(54) LENS HOOD FOR WINDSHIELD CAMERA

(71) Applicant: K.L. Kaschier-und Laminier GmbH, Bad Bentheim-Gildehaus (DE)

(72) Inventor: Rembert Schulze Wehninck, Munich (DE)

(73) Assignee: K.L. KASHIER-UND LAMINIER GMBH, Bad Bentheim-Gildehaus (DE)

( * ) Notice: Subject to any disclaimer, the term of this patent is extended or adjusted under 35 U.S.C. 154(b) by 0 days.

(21) Appl. No.: 15/406,808

(22) Filed: Jan. 16, 2017

(65) Prior Publication Data

US 2017/0205625 A1   Jul. 20, 2017

(30) Foreign Application Priority Data

Jan. 14, 2016   (DE) .................. 10 2016 000 269

(51) Int. Cl.
| | |
|---|---|
| H04N 7/12 | (2006.01) |
| H04N 9/47 | (2006.01) |
| G02B 27/00 | (2006.01) |
| B60R 11/04 | (2006.01) |
| G03B 17/55 | (2006.01) |
| H05B 3/14 | (2006.01) |
| H05B 3/16 | (2006.01) |
| H05B 3/26 | (2006.01) |
| H05B 3/84 | (2006.01) |
| G02B 5/00 | (2006.01) |
| H04N 5/225 | (2006.01) |
| H05B 3/00 | (2006.01) |

(Continued)

(52) U.S. Cl.
CPC .......... *G02B 27/0006* (2013.01); *B60R 11/04* (2013.01); *G02B 5/003* (2013.01); *G03B 11/045* (2013.01); *G03B 17/55* (2013.01); *H04N 5/2253* (2013.01); *H05B 3/0042* (2013.01); *H05B 3/14* (2013.01); *H05B 3/16* (2013.01); *H05B 3/20* (2013.01); *H05B 3/26* (2013.01); *H05B 3/84* (2013.01); *B60R 2011/0026* (2013.01); *H05B 2203/013* (2013.01); *H05B 2203/016* (2013.01); *H05B 2214/02* (2013.01)

(58) Field of Classification Search
None
See application file for complete search history.

(56) References Cited

U.S. PATENT DOCUMENTS

| | | | |
|---|---|---|---|
| 3,694,622 | A | 9/1972 | Bentley |
| 2010/0170889 | A1 * | 7/2010 | Keite-Telgenbuscher .................. C09J 7/38 219/546 |

(Continued)

FOREIGN PATENT DOCUMENTS

DE   102014006923 A   12/2014

*Primary Examiner* — Talha M Nawaz
(74) *Attorney, Agent, or Firm* — Andrew Wilford

(57) ABSTRACT

The lens hood used in combination with a camera on a back face of a windshield has a bottom wall spaced below the windshield and having an upper face turned toward the windshield, and a flat heating element carried on the upper face of the bottom wall. The surface of the bottom wall of the lens hood facing the windshield has a scattered light-capturing structure, and the surface of the heating element, as part of the bottom wall, at least partially forms this structure. The heating element is embedded in the bottom wall of the lens hood, so that the heating element completely or at least partially forms the upper face of the bottom wall.

15 Claims, 1 Drawing Sheet

(51) Int. Cl.
*H05B 3/20* (2006.01)
*G03B 11/04* (2006.01)
*B60R 11/00* (2006.01)

(56) References Cited

U.S. PATENT DOCUMENTS

2013/0314540 A1* 11/2013 Hacker ................... B60J 1/002
              348/148
2015/0034621 A1* 2/2015 Timmermann ......... B60R 11/04
              219/203

\* cited by examiner

LENS HOOD FOR WINDSHIELD CAMERA

FIELD OF THE INVENTION

The present invention relates to lens hood for a camera. More particularly this invention concerns such a camera that is mounted on the back face of a motor-vehicle windshield.

BACKGROUND OF THE INVENTION

Such a lens hood typically has a flat heating element on a bottom wall of the lens hood, serving mainly to eliminate condensate that could cloud or distort the image. In a lens hood of this type described in DE 10 2014 006 923 A1, the heating element is spaced below the upper surface of the bottom wall of the lens hood. This results in nonuniform heat distribution, and requires a relatively high energy level to prevent fogging or icing.

OBJECTS OF THE INVENTION

It is therefore an object of the present invention to provide an improved lens hood for a windshield camera.

Another object is the provision of such an improved lens hood for a windshield camera that overcomes the above-given disadvantages, in particular that a uniform heat distribution with high efficiency results, and that is easy to manufacture.

SUMMARY OF THE INVENTION

The lens hood used in combination with a camera on a back face of a windshield according to the invention has according to the invention a bottom wall spaced below the windshield and having an upper face turned toward the windshield, and a flat heating element carried on the upper face of the bottom wall.

A lens hood with this design results in a very uniform heat distribution due to the heating element in the upper face of the bottom wall. The heat is generated at the exact location where it is essential to prevent fogging or icing. This is carried out with a low expenditure of energy.

To this end, it is also proposed that the surface of the bottom wall of the lens hood facing the windshield has a scattered light-capturing structure, and the surface of the heating element, as part of the bottom wall, at least partially forms the structure. Preferably the heating element is embedded in the bottom wall of the lens hood, so that the heating element completely or at least partially forms the front or upper surface of the bottom wall.

It is advantageous when the heating power and the heat distribution of the flat heating element are uniform over its entire surface area.

It is particularly advantageous when the flat heating element, as a heat generator, has a homogeneous electrically conductive plastic layer or plastic film containing conductive particles. In this regard, the heating conductive layer or film of the heating element should have a thickness of 60 to 150 μm. It is also particularly advantageous when the heating conductive film of the heating element is perforated or slitted.

Reliable conduction of heat upward in the lens hood is achieved when the back face of the heating conductive layer or film of the heating element is covered with a thermally insulating layer or film. The thermally insulating layer may be a foam layer.

Preferably the heating conductive layer or film of the heating element is covered, in particular adhered, with a cover film on one side. The cover film may be an electrically insulating TPU film. In this regard, the TPU film may form the a structure that captures scattered light. It is also advantageous when the side of the cover film facing the heating layer carries an adhesive layer.

Power-supply electrodes situated at the sides of the heating element are inclined or parallel with respect to one another. Uniform heat distribution with a low energy expenditure is also achieved when the heating element has the shape of an isosceles trapezoid.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
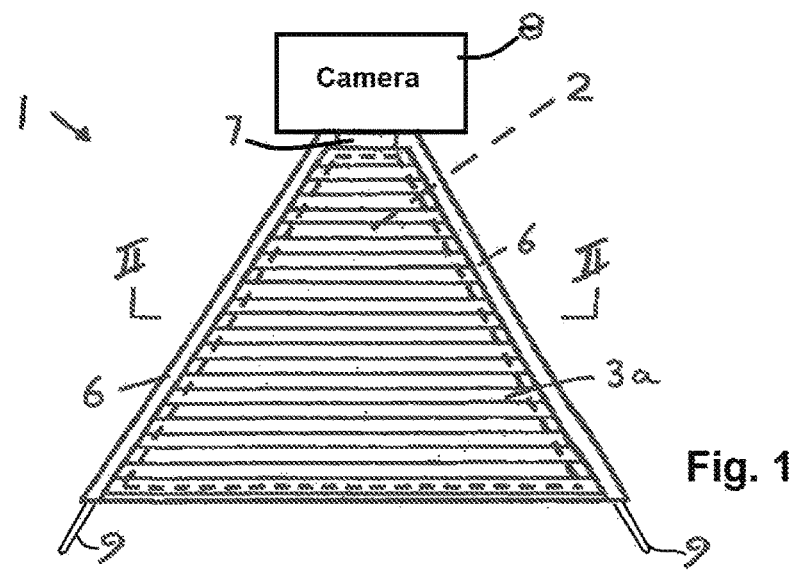
FIG. 1 is a top view of the lens hood according to the invention.
Figure 2:
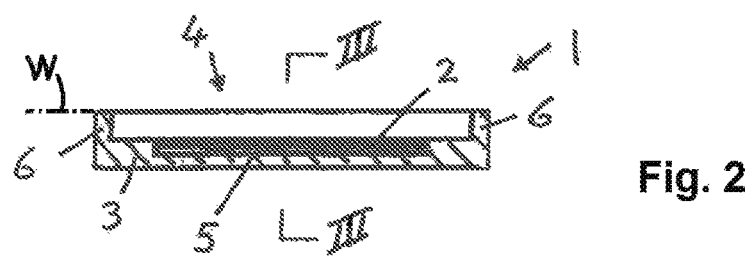
FIG. 2 is a section taken along line II-II of FIG. 1.
Figure 3:
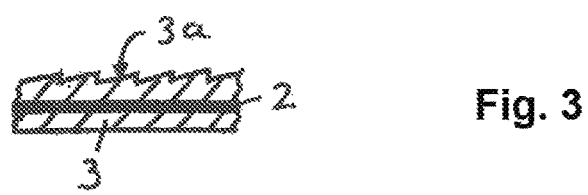
FIG. 3 is a section taken along line III-III of FIG. 2 with the heating element embedded in the bottom wall of the lens hood.

As seen in FIG. 1, a lens hood 1 according to the invention has a bottom wall 3 shaped as a truncated isosceles trapezoid whose two sides have an upraised edge lip 6 projects in each case. The two side edges converge toward one other to form an opening 7 in which a lens of a camera shown schematically at 8 is provided. The height of the side edge lips 6 increases toward the opening 7 and the upper surfaces of the edge lips 6 are adhered to the angled back face of a windshield shown schematically at W (FIG. 2). Alternatively, however, the lens hood 1 may have some other shape, in particular a rectangular shape.

Figure 4:
FIG. 4 is a section like FIG. 3 but with the heating element on the upper face of the bottom wall, so that the heating element itself forms the a light-capturing structure.

A heating element 2 is embedded in the bottom wall 3 of the lens hood is provided at the front or top face 3a turned generally upward toward the back face of the unillustrated windshield W. The upper face 3a of the bottom wall 3 forms the scattered light-capturing structure of the bottom wall 3, with the heating element 2 forming the front-side surface of the bottom wall, so that the surface of the heating element, as part of the bottom wall, forms the structure itself. This is illustrated in FIG. 4. The structuring is preferably parallel grooves or ridges, in particular having a sawtooth cross section.

The heating element 2 has uniform heating power, and thus a uniform heat distribution over its entire surface area. This is also achieved by the fact that the flat heating element 2, as a heat generator, has a homogeneous electrically conductive plastic layer or plastic film containing conductive particles.

The heating conductive layer or film of the heating element 2 has a thickness of 60 to 150 μm. The heating conductive film is perforated or slitted. This has the advantage that the surface structure is variable, and installation aids (clips, retaining pins, etc.) may be taken into account.

To ensure that the heat energy generated by the heating element is emitted essentially only toward the windshield W, the back face of the heating conductive layer or film of the heating element 2 is covered with a thermally insulating layer or film 5. In one embodiment, a foam layer forms the thermally insulating layer.

Figure 5:
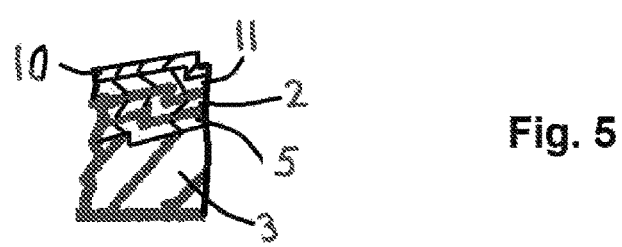
FIG. 5 is a large-scale sectional view of a detail of the invention.

Manufacture and installation are simplified as shown in FIG. 5 when the heating conductive layer or film of the heating element 2 is covered, in particular adhered, with a cover film 10 on one side. The cover 10 film may be an electrically insulating TPU film. In this regard, the TPU film may include a structure that captures the scattered light. In a further embodiment, in addition, the side of the cover film facing the heating layer carries an adhesive layer 11.

Power-supply electrodes 9 on the sides of the heating element are angled corresponding to the converging side edges 6. These power-supply electrodes 9 are made in particular of copper, silver, or silver-plated copper.

To heat the bottom wall 3 with the heating element 2 to the greatest extent possible, the heating element has the same truncated isosceles trapezoidal shape or rectangular shape as the bottom wall 3 of the lens hood.

I claim:

1. In combination with a camera on a back face of a windshield, a lens hood comprising:
    a bottom wall spaced below the windshield and having an upper face turned toward the windshield;
    a light-capturing structure on and at least partially formed by the upper face; and
    a flat heating element carried on the upper face of the bottom wall.

2. The combination defined in claim 1, wherein the heating element is embedded in the bottom wall of the lens hood, so that the heating element completely or at least partially forms an upper face of the bottom wall.

3. The combination defined in claim 1, where the flat heating element has a surface over all of which heating power and heat distribution are uniform.

4. The combination defined in claim 1, wherein the flat heating element has a homogeneous electrically conductive plastic layer or plastic film containing conductive particles.

5. The combination defined in claim 4, wherein the conductive layer or film of the heating element has a thickness of 60 to 150 µm.

6. The combination defined in claim 4, wherein the heating conductive film of the heating element is perforated or slitted.

7. The combination defined in claim 4, further comprising:
    a thermally insulating layer or film covering a bottom face of the heating conductive layer or film of the heating element.

8. The combination defined in claim 7, wherein the thermally insulating layer is foam.

9. The combination defined in claim 4, wherein the heating conductive layer or film of the heating element is covered with a cover film on one side.

10. The combination defined in claim 9, wherein the cover film is an electrically insulating thermoplastic polyurethane film.

11. The combination defined in claim 10, wherein the thermoplastic polyurethane film includes a structure that captures scattered light.

12. The combination defined in claim 9, further comprising:
    an adhesive layer on a face of the cover film facing the heating layer.

13. The combination defined in claim 1, further comprising:
    power-supply electrodes at sides of the heating element and angled relative to one another.

14. The combination defined in claim 13, wherein the power-supply electrodes at the sides of the heating element are made of copper, silver, or silver-plated copper.

15. The combination defined in claim 1, wherein the bottom wall of the heating element is shaped as a isosceles trapezoid.

* * * * *